INVENTOR.
LOUIS J. GAVASSO
BY Gordon R. Santorn
AGENT

INVENTOR.
LOUIS J. GAVASSO
BY Gordon R. Santorn
AGENT

Dec. 17, 1963 L. J. GAVASSO 3,114,500

RECORDING METHOD AND MEANS

Filed April 3, 1961 8 Sheets-Sheet 3

INVENTOR.
LOUIS J. GAVASSO
BY Gordon R. Hanborn
AGENT

Dec. 17, 1963 L. J. GAVASSO 3,114,500

RECORDING METHOD AND MEANS

Filed April 3, 1961 8 Sheets-Sheet 4

INVENTOR.
LOUIS J. GAVASSO

BY Gordon R. Santom

AGENT

RECORDING METHOD AND MEANS

Filed April 3, 1961 8 Sheets-Sheet 5

INVENTOR.
LOUIS J. GAVASSO
BY Gordon R. Sanborn
AGENT

RECORDING METHOD AND MEANS

Filed April 3, 1961 8 Sheets-Sheet 6

INVENTOR.
LOUIS J. GAVASSO
BY Gordon R. Hanborn
AGENT

INVENTOR.
LOUIS J. GAVASSO
BY
Gordon R. Stanton
AGENT

3,114,500
RECORDING METHOD AND MEANS

Louis J. Gavasso, Detroit, Mich., assignor to Burroughs Corporation, Detroit, Mich., a corporation of Michigan Filed Apr. 3, 1961, Ser. No. 100,229
14 Claims. (Cl. 234—1)

Figure 1:
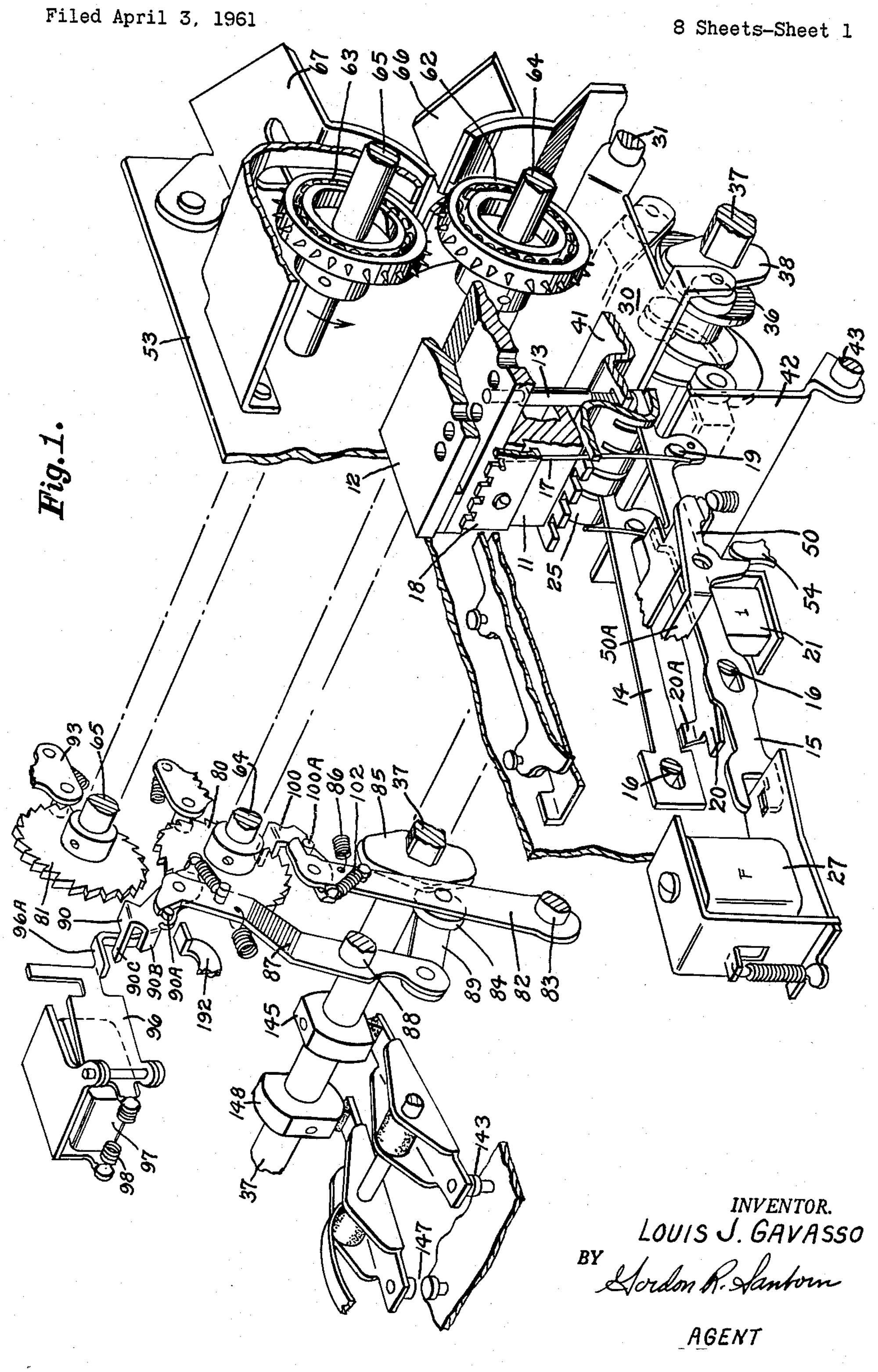

The present invention relates to recording of information and more particularly to an improved method as well as means for selectively recording information on one or a plurality of separate pieces of record material.

Record producing devices such as tape perforators of the type which operate to sequentially punch coded information into a strip of material are normally used in combination with information generating machines such as typewriters and accounting machines. In applications where a perforated record is produced in response to the operation of an accounting or similar type machine, it may be desirable to segregate separate types of information to facilitate later data processing. For example, when used in connection with an accounting machine it may be desirable to record a first type of information on each of a plurality of tapes while recording a second type of information only on one tape. One such example is that in which a retail establishment desires to record tax information on one tape and to record cash received on another tape. One method of segregating and selectively recording different types of information on different record mediums is to couple separate recording devices with the information generating machine in a manner such that the performance of selected operations serves to render selected recording devices operable. This of course increases the cost of the installation considerably due to the duplication of recording devices.

Therefore, it is an object of the present invention to provide an improved method of recording information. A further object is to provide an improved method of producing a plurality of records containing selected bits of information using only a single recording apparatus.

Another object of the present invention is to provide an improved record producing device. Another object is to provide an improved tape perforator having a single set of punch pins which is operable to selectively perforate bits of information in one or a plurality of tapes. A further object is to provide a tape perforator having a plurality of independent tape feed devices which can be selectively and independently rendered operative or nonoperative.

A final object of this invention is to provide a perforating apparatus for selectively punching one, the other, or each of two tapes and in which the selection of the tape or tapes to be perforated can be made during the cycle of operation of the perforator in which the punching takes place.

These objects are achieved in accordance with the present invention by positioning two pieces of record material in juxtaposition adjacent a plurality of marking elements so that each piece of material will be marked by the single operation of the marking devices. Individually and selectively operable feed or record advancing mechanisms are then operated to advance the strips of material which have been selected to receive the information. Prior to an operation in which information is to be recorded on only one piece of record material, each of the marking elements is first energized to simultaneously mark each of the materials. The selected material is then advanced so that when a selected combination of recording elements is energized at a later time the advanced material will be marked while the non-advanced material will be unaffected.

It is common in the art to mark the material in a manner to indicate the end of a unit of information or to indicate a feed operation so that the machine used to process the record at a later time can distinguish between adjacent units or "words." Therefore it is advantageous to have the "end-of-word" or tape feed code comprise a plurality of marks across the tape, which may be equal to the number of recording areas on the tape. This is accomplished by energizing all or substantially all of the marking devices at one time. Therefore if one tape is advanced and the other is held stationary following the energization of each marking device to simultaneously mark each tape on each of its record receiving areas, a subsequent energization of a selected combination of marking devices representative of a bit of information will serve to mark only the advanced tape. The energization of such selected marking devices does not affect the tape held stationary since it was previously marked in its record receiving areas by the operation of each of the marking devices for the end-of-word or tape feed indication.

In the tape perforator illustrated herein the punch pins are driven through the two tapes aligned therewith to simultaneously perforate the tapes with the end-of-word code. Thereafter if only one tape is advanced the subsequent movement of a selected combination of information representing pins will serve to perforate only the advanced tape since the pins will pass through the end-of-word holes previously punched in the nonadvanced tape. Separately operable tape feed or advancing mechanisms serve to provide the necessary control for advancing only selected tapes. Since the type of information to be recorded on a subsequent information generating cycle of operation might not be determined until such operation actually occurs, and hence a determination made at that time as to which of the two tapes is to be perforated, the record feed mechanism in the perforator of the present invention operates prior to the punching portion of each cycle. That is, the sequence of operation of the perforator is feed and then punch, as compared to many prior art perforators in which the sequence is to punch and then feed. By feeding the selected tape or tapes prior to the actual punching operation the tape selection can be made during the cycle of operation in which the punching occurs.

Figure 2:
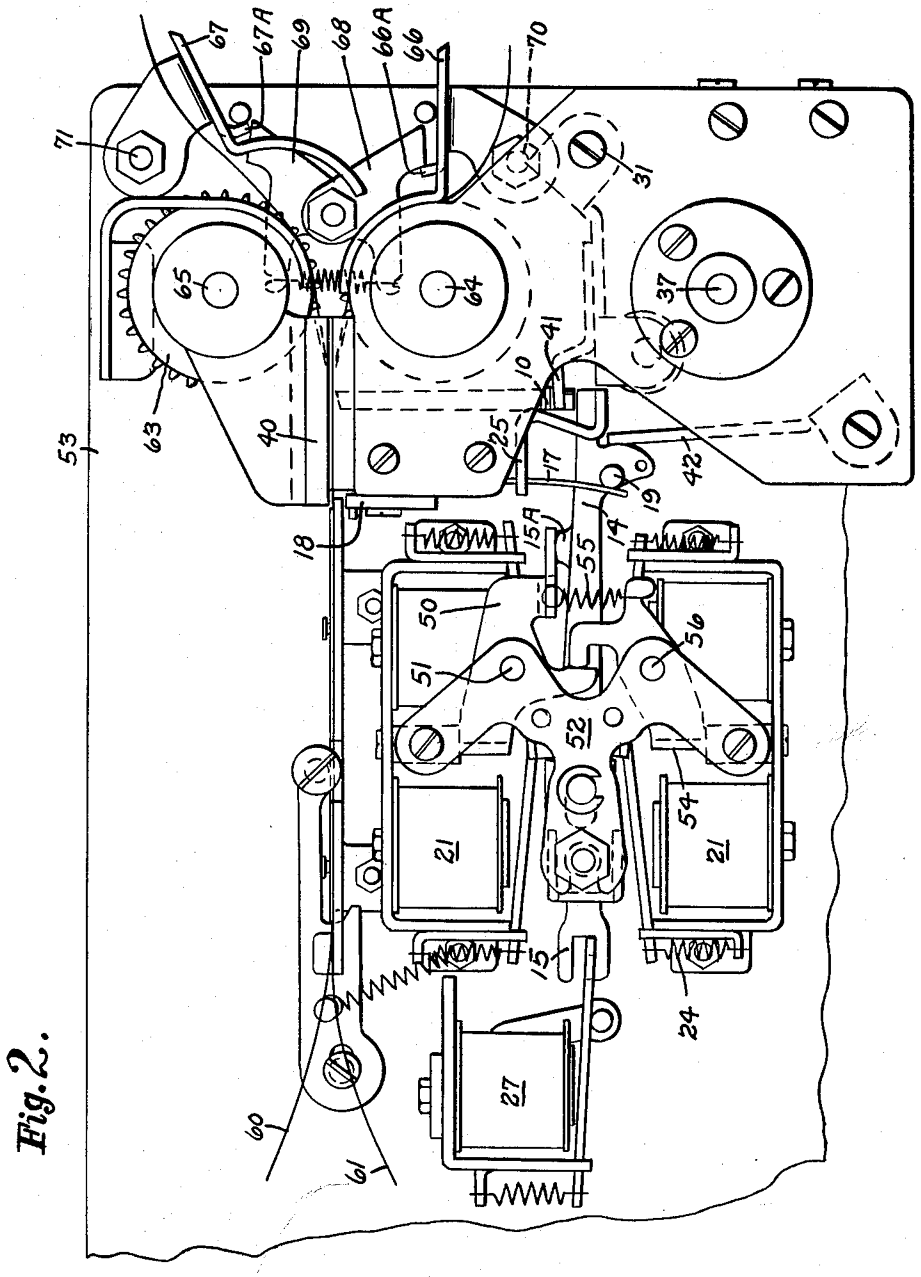
Figure 3:
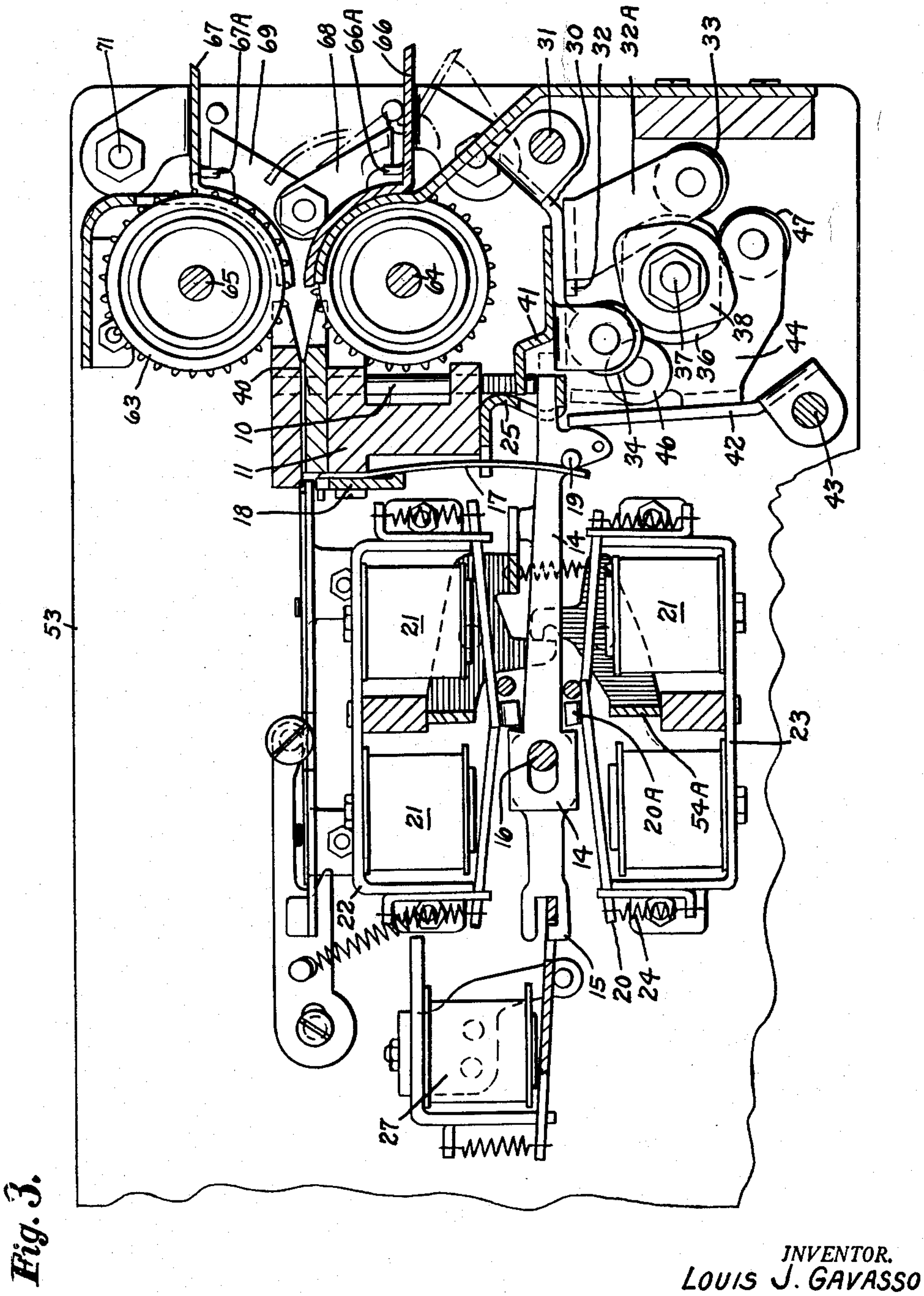
Figure 4:
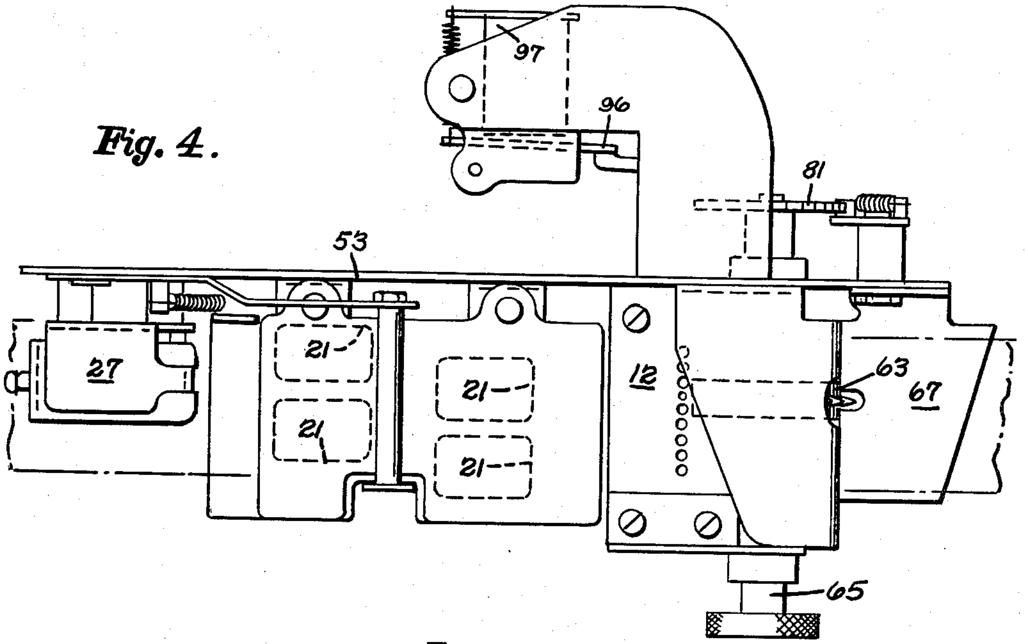
Figure 5:
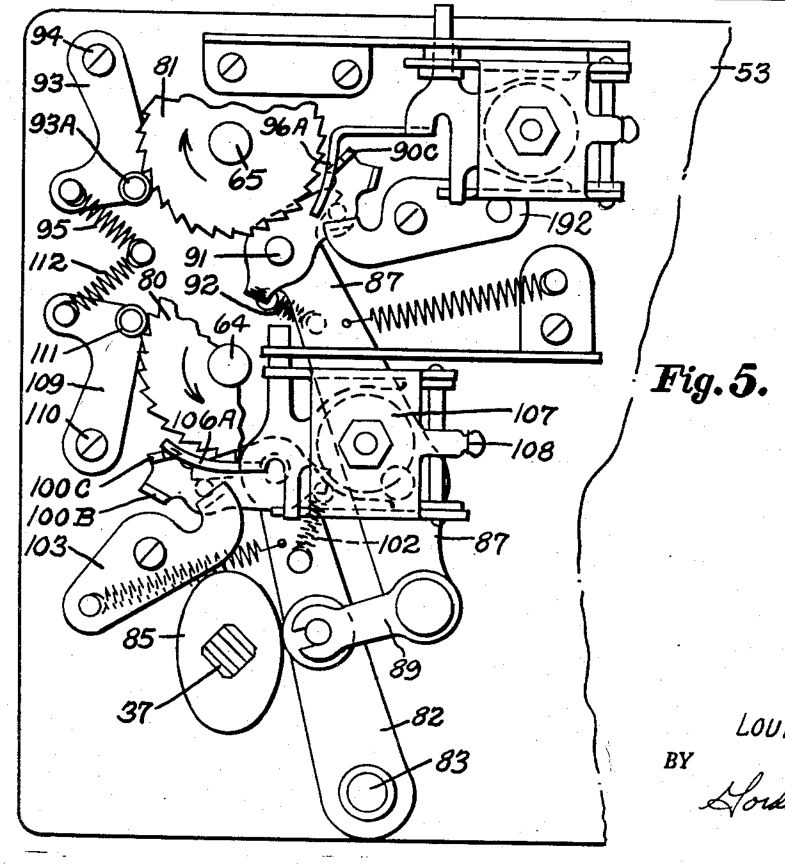
Figure 9:
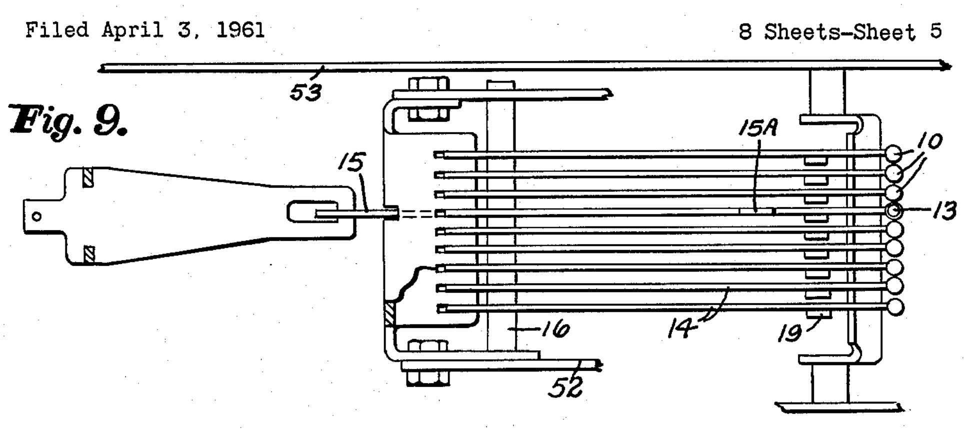
Figures 6, 7:
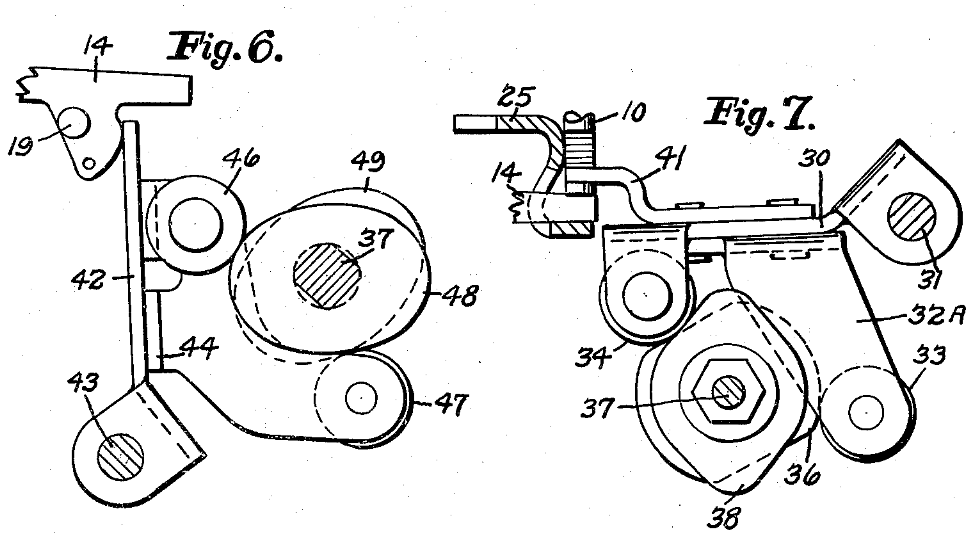
Figure 8:
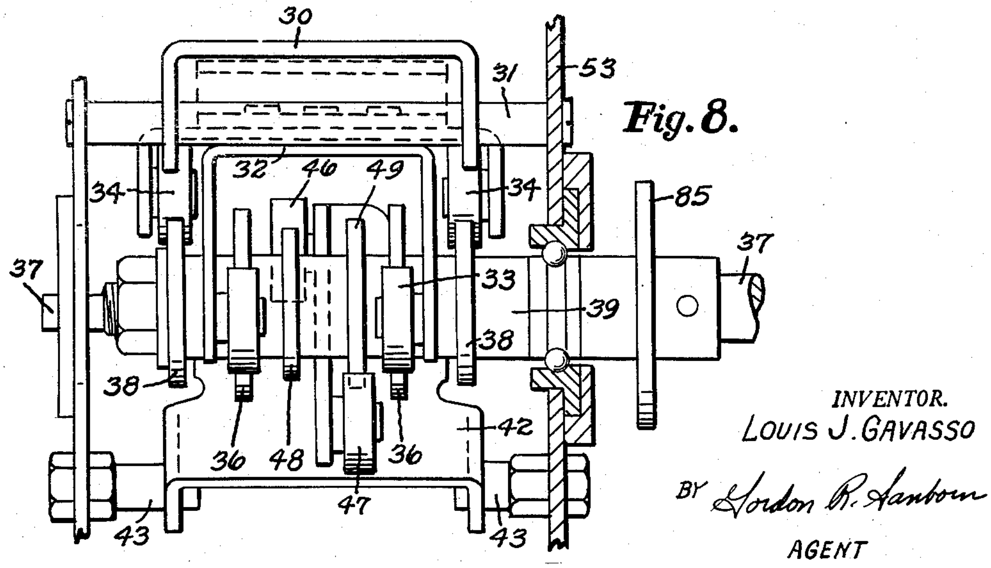
Figure 10:
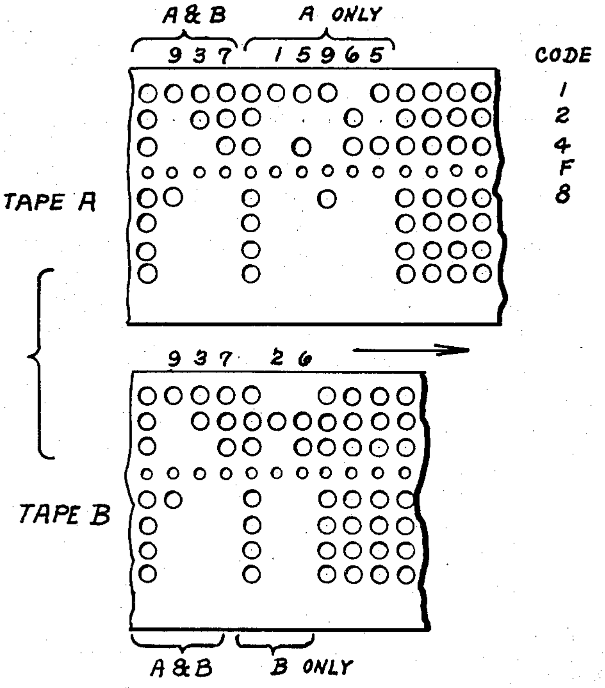
Figure 13:
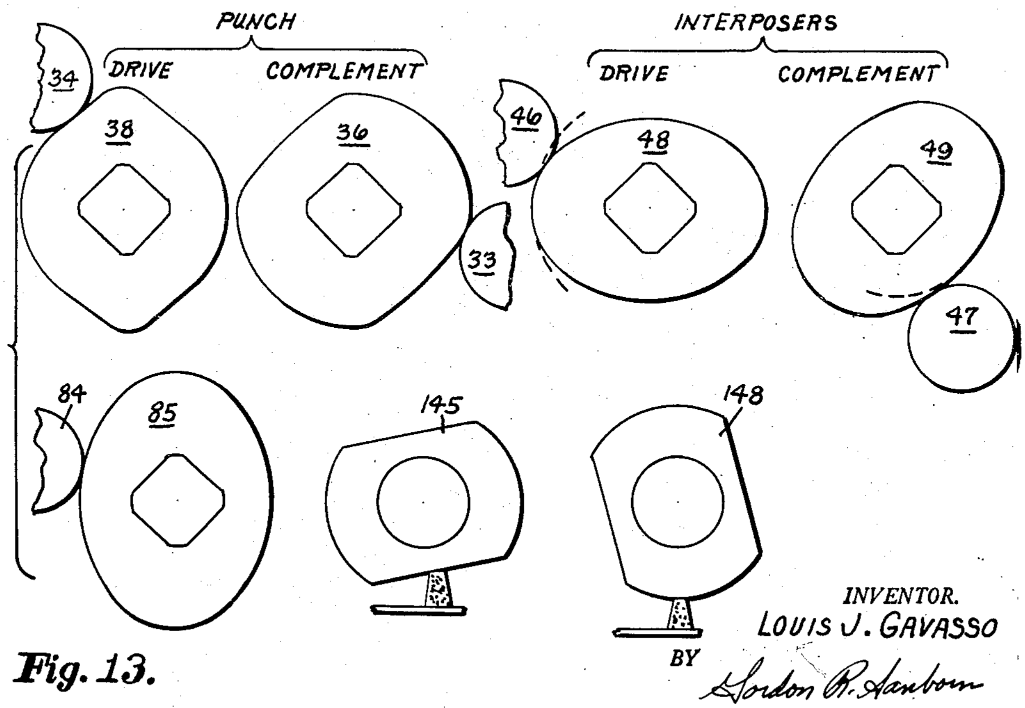
Figures 11, 11A:
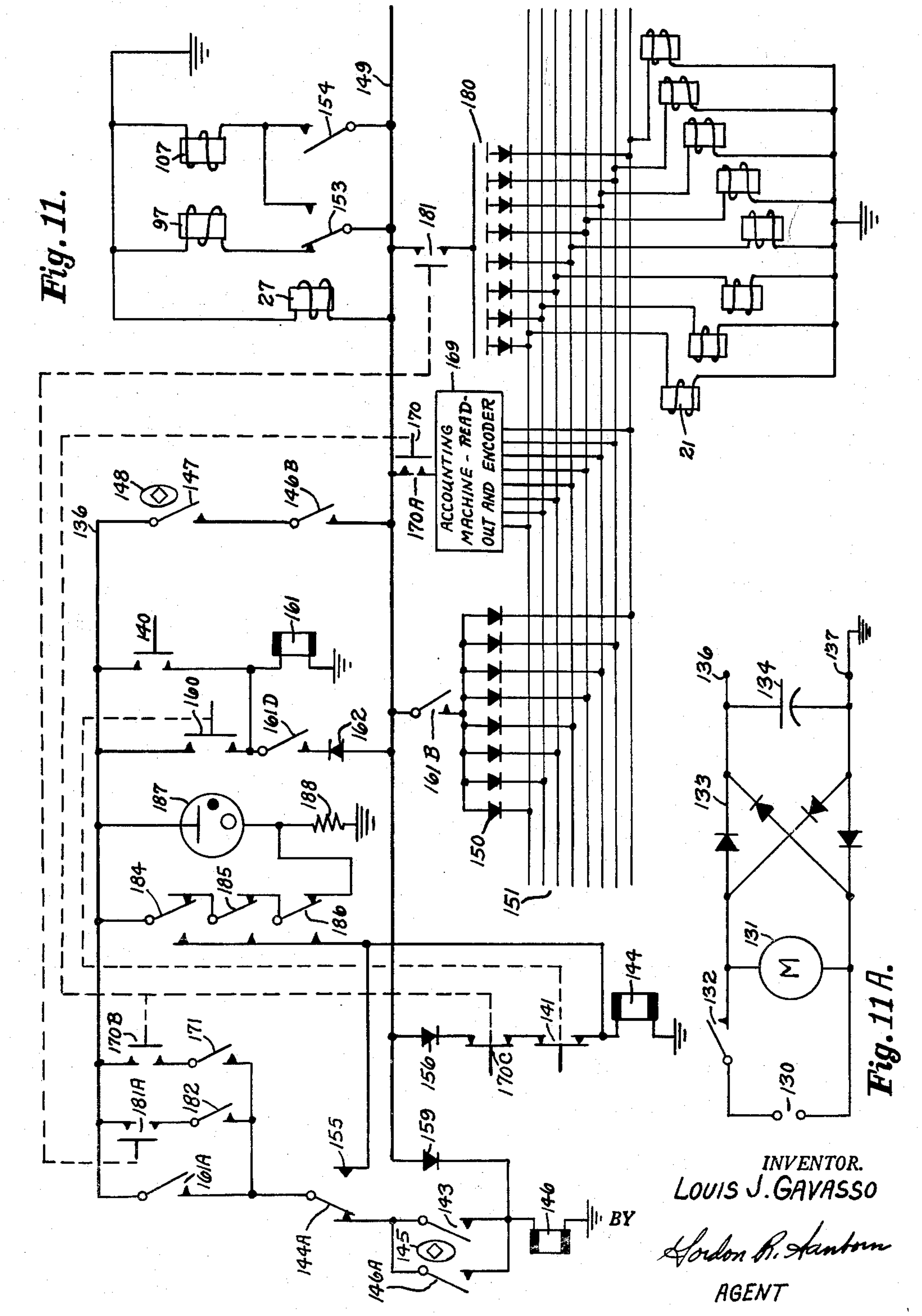
Figure 12:
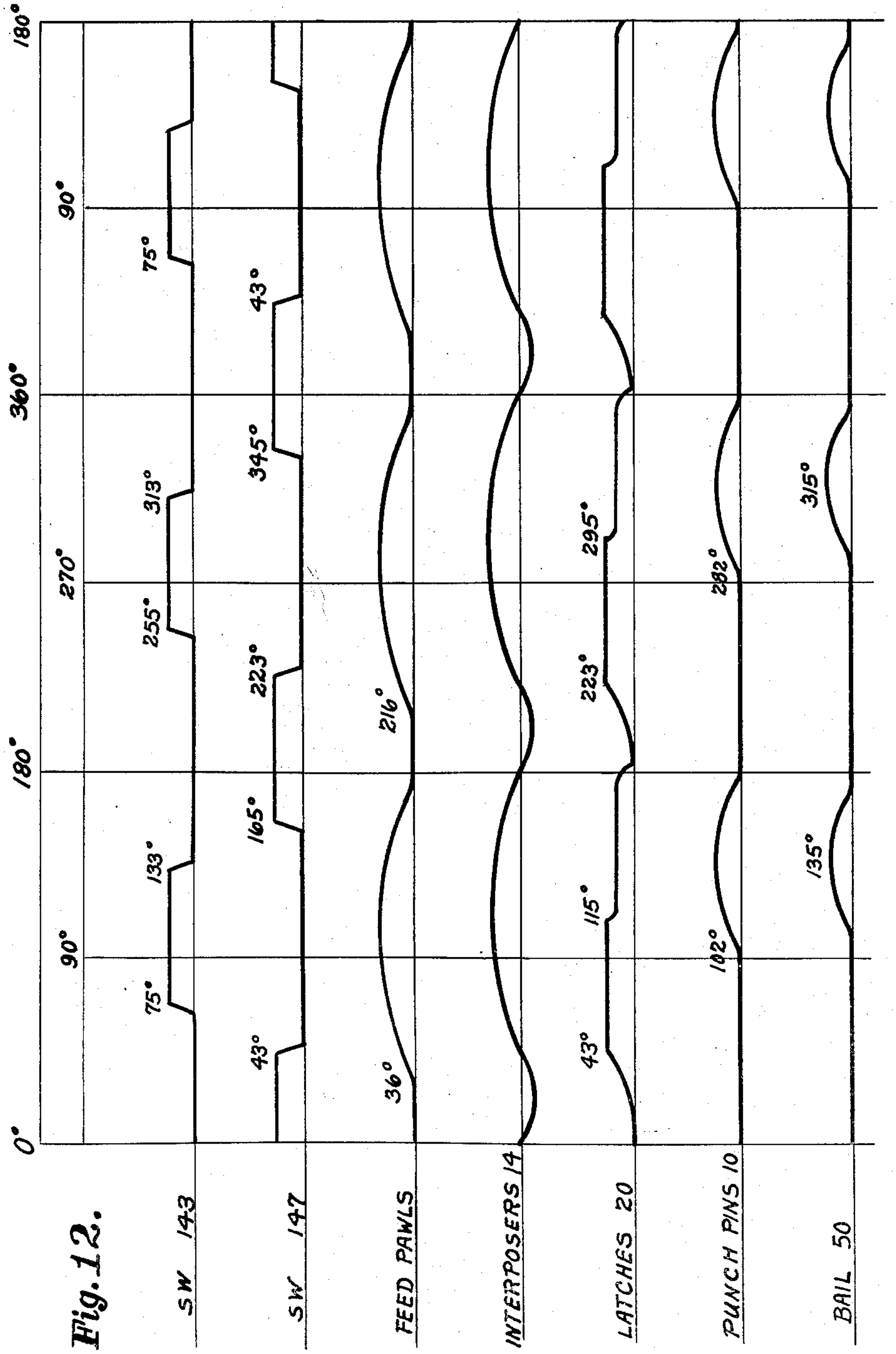

The above and other objects of the present invention are set forth in the appended claims, but the invention itself as well as additional advantages and objects thereof will be more clearly understood from the following description when read with reference to the accompanying drawings wherein, FIG. 1 is a perspective view from the right front corner of the perforator with sections broken away and with the tape feed devices being displaced from the main supporting frame of the perforator to more clearly illustrate their manner of operation, FIG. 2 is a right elevation of the perforator, FIG. 3 is a right section of the perforator showing the punch interposers driven forwardly of their normal positions to facilitate operation of their associated clapper latches, FIG. 4 is a top view of the perforator, FIG. 5 is a left elevation of the tape feeding mechanism, FIG. 6 is an enlarged view from the right showing the interposer control bail and the cams associated therewith, FIG. 7 is an enlarged view from the right side showing the punch driving bail and the cams associated therewith, FIG. 8 is a rear view of the main driveshaft with the various cams disposed thereon, FIG. 9 is a top view of the interposers and punch pins associated therewith, FIG. 10 is an illustration of two pieces of tape showing the result of the selective perforation of records by the perforating device, FIG. 11 is a circuit diagram illustrating one circuit for operating the tape perforator, FIG. 11A is a circuit diagram of the power supply used in connection with the circuit of FIG. 11, FIG. 12 is a timing chart showing the time during which various parts of the perforator operate, and FIG. 13 includes an illustration of the shape of each of the cams on the main drive shaft of the perforator.

In the following description the words up, above, down, and below, and right, left, clockwise and counterclockwise as well as front and rear will be used with reference to the mechanism as seen by a viewer positioned in front of, above, or on the right-hand side thereof.

Referring now to the drawings and in particular to FIGS. 1, 3 and 9 the perforator is seen to have a plurality of punch pins 10 disposed within openings provided in a punch guide block 11 in a manner such that they are aligned with openings in a punch die 12. A single feed punch pin 13 which is of smaller diameter than the punch pins 10 is provided for punching the necessary tape feed holes. Each of the punch pins 10 is disposed on the upper rear surface of an interposer member 14 while the feed pin 13 is disposed on top of the feed interposer 15. The interposers are supported at their front ends by a common shaft 16 and at their rear ends by a slotted guide plate 25. As seen in FIG. 3 the interposers are so supported that they are movable in a substantially horizontal plane and are each urged rearwardly by the individual spring members 17. The spring members 17 are held in place by a small plate 18 screwed to the front surface of the punch guide block 11, and each engages the rightwardly extending stud 19 provided on each of the interposers. The interposers 14 are normally held in their forward positions through the engagement of a lug 20A on individual clappers which serve as interposer latches 20 controlled by the solenoids 21 supported by the frames 22 and 23. Coil spring 24 associated with each latch 20 serves to maintain each in a position such that the associated interposer is normally held in its forward position. To facilitate a compact arrangement of the control solenoids and interposers, the feed solenoid 27 which controls the feed interposer 15 is disposed forwardly of the solenoids 21, but the operation of each of the solenoids and interposers is the same in that normally each interposer is held in its forward position with the associated solenoid not being energized, and upon energization of the associated solenoid is released to move rearwardly under the urge of a spring 17.

As seen in FIG. 3, each of the punch pins and the rear ends of the associated interposers when in their forward positions are disposed in front of a driving bail 30 pivoted at shaft 31 and adapted for reciprocating motion. The bail 30 has a first plate 32 secured to its lower surface and provided with a pair of downwardly extending arms 32A which carry rollers 33. A second pair of rollers 34 are carried by the downwardly bent portions of the bail 30. The rollers 33 engage identical cams 36 on the main drive shaft 37 while the rollers 34 engage identical cams 38 on the drive shaft 37. As seen in FIGS. 1 and 8 the shaft 37 has flats thereon to hold the cams against rotation with respect thereto, adjacent cams being separated by spacing collars 39. The cams 36 and 38 may be designated as complementary cams in that they are so shaped that the bail 30 is positively driven first in one direction and then returned in an opposite direction. Since each of the cams has two lobes thereon the arrangement is such that the bail 30 is reciprocated upwardly and downwardly twice during each rotation of the main drive shaft 37.

During such reciprocation of the bail 30 the punch pins normally remain in their lowered positions since as seen in FIG. 3 the rear ends of their associated interposers are disposed forwardly of the front edge of the bail 30. It is also seen that if the interposer is moved rearwardly to a position where it is disposed in the path of travel of bail 30 the associated punch pin will be driven from its rest position to its marking position and in so moving will perforate any record material disposed within the opening 40 defined by the punch block 11 and the punch die 12. Each of the punch pins has a portion cut away near its lower end so that each pin will be adaptable to a corresponding slot cut in the slotted plate 41 secured to the top of punch bail 30. Therefore the downward movement of the bail 30 will serve to return each displaced pin to its home or rest position.

The movement of the interposers into a position where they will be driven by the bail 30 is controlled by an interposer bail 42 pivoted at 43. A plate 44 secured to the rear surface of bail 42 carries a pair of rollers 46 and 47 which respectively engage the complimental cams 48 and 49 secured to drive shaft 37. The bail 42 is therefore driven forwardly and rearwardly twice during each rotation of shaft 37 and is so timed with respect to the movement of punch bail 30 that the interposers are allowed to move to their rearmost positions for engagement by the punch bail during the time when the bail 30 is in its lowered position. The bail 42 not only controls the rearward travel of the interposers but also serves to restore each interposer to its forward position where it can be relatched by the associated latch 20. As will be described with more particularity hereinafter, the punch feed interposer 15 is released during every perforating cycle of operation and therefore the movement thereof by the punch bail 30 can be used to drive each of the latches away from its associated solenoid coil and hence prevent hanging of the clappers due to residual magnetism. To this end the punch feed interposer 15 has an upwardly extending lug 15A thereon which is engageable with a first knock-off bail 50 pivoted on a shaft 51 carried by the brackets 52 (one of which is shown in FIG. 2). As seen in FIGS. 1 and 2 the bail 50 has a horizontal portion 50A which overlies each of the latches 20 associated with the upper bank of solenoids. A similar knockoff bail 54 which is engaged and driven by the bail 50 is pivoted on a shaft 56 so that its horizontal portion 54A is disposed beneath the interposer latches controlled by the lower solenoids. Therefore when the punch feed interposer 15 engages the knock-off bail 50, bail 50 will be driven counterclockwise and bail 54 will be driven clockwise. Coil springs 55 hold the knock-off bails in their normal positions away from the interposer latches.

When the interposer bail 42 drives the interposers to their home positions the latches 20 will be driven away from their associated solenoids so that they can re-latch the interposers. It should be noted that during such rearward and forward travel of the interposers the associated punch pins remain disposed on the top rear edges thereof. An advantage of this drive arrangement is that the interposers can be driven forwardly to their home positions while the punch pins are completing their upward drive under momentum. To increase the speed of operation by facilitating release of the interposers from their latches, the interposer bail 42 is operative to overdrive the interposers by a small amount in the forward direction to the positions of FIG. 3 so that each interposer is disengaged from the associated latch during the time that the solenoids are receiving the control signals.

As seen in FIG. 2, two strips of tape 60 and 61 are held in juxtaposition in the punch throat or opening 40, and therefore each of the punch pins is operative upon being driven from its home position into the punch die to simultaneously pass through each of the tapes. First and second tape feeding sprocket wheels 62 and 63 supported for independent rotation by the shafts 64 and 65 are respectively engaged with the feed holes punched in the tapes 60 and 61 by the feed punch pin 10. Individual tape guide plates 66 and 67 pivoted at 70 and 71 on frame 53 are associated with the feed sprocket wheels 62 and 63 for maintaining the respective tapes engaged with the feed pins thereon. The guide members 66 and 67 each have depending lugs 66A and 67A respectively engaged with the detent members 68 and 69. A spring connected to the forwardly extending tails of the detent members 68 and 69 serves to constantly urge the two guide members 66 and 67 toward the associated sprocket wheels. To facilitate the positioning of a new strip of tape in the perforator, each of the guide members 66 and 67 is pivotable about its supporting point as illustrated in FIG. 2 wherein it is seen that the upper guide member 67 has been rotated counterclockwise while the upper tape 60 is being positioned in the punch. With the guide plate in the position shown in FIG. 2 the detent member 69 serves to yieldingly hold it away from the sprocket wheel 63.

The perforator is operable to selectively punch one, the other, or both of the two tapes disposed in the punch throat and therefore independent tape feed mechanisms are provided for the two tapes. Accordingly, as seen in FIGS. 1 and 5 separate ratchet wheels 80 and 81 are secured respectively to shafts 64 and 65 which in turn carry the sprocket wheels 62 and 63. A first driving lever 82 pivoted at 83 on the left side of frame 53 has a roller 84 secured on its left side for engagement with a cam 85 secured to the main drive shaft 37. A coil spring 86 serves to hold the roller 84 in engagement with the cam 85, the shape of cam 85 being such that the upper end of driving arm 82 is reciprocated forwardly and rearwardly twice during each rotation of the main drive shaft 37. A second driving lever 87 pivoted on a shaft 88 extending to the left from frame 53 is coupled with the first lever 82 by means of a short pitman 89 which is pinned to the lower end of lever 87 and to lever 82 by the same pin which holds the roller 84. Therefore it is seen that each rotation of the drive shaft 37 causes the upper end of lever 87 to move in a rearwardly direction at the same time that the upper end of lever 82 is moving in a forwardly direction.

A first tape feed pawl 90 is pivoted at 91 on the upper end of the drive lever 87 and is urged in a clockwise direction thereon by means of a small coil spring 92 connected to the lower rear end of the pawl and to a leftwardly extending stud on the lever 87. The pawl 90 has a rightwardly extending stud 90A which is engageable with the upper end of lever 87 and therefore serves to position the pawl 90 on the lever 87. With the stud 90A engaged with the upper end of lever 87 the pawl 90 is so positioned with respect to the ratchet wheel 81 that the downward and rearward drive of the upper end of lever 87 brings the driving surface of pawl 90 into engagement with the ratchet wheel 81 and thereby serves to advance the ratchet wheel 81 by one tooth. Near the end of such a driving movement of pawl 90 a leftwardly extending lug 90B on the pawl becomes engaged with a rigid stationary abutment member 192 secured to the left side of frame 53. This engagement of the lug 90B with the bent-over portion of the abutment member 192 serves to hold the pawl against the ratchet wheel 81 and prevent overthrow of the ratchet wheel. A detent arm 93 pivoted at 94 on the frame 53 has a leftwardly extending roller 93A engaged between adjacent teeth of the ratchet wheel 81. A coil spring 95 holds the roller 93A in engagement with the ratchet wheel 81 and hence serves to positively position the ratchet wheel 81.

From the above it will be seen that the repeated reciprocation of drive arm 87 would normally repeatedly step the upper ratchet wheel 81 in a counterclockwise direction to thereby advance the upper tape 60. The engagement of the pawl 90 with the ratchet wheel 81, however, is controlled by the clapper latch 96 associated with a solenoid 97 positioned on the left side of the frame 53. The clapper 96 has an arcuate lug 96A which is engageable with the leftwardly extending lug 90C on pawl 90, the shape of said lug 96A being such that if it is maintained behind the lug 90C on pawl 90 the pawl 90 will be prevented from engaging the ratchet wheel 81. A coil spring 98 (FIG. 1) serves to normally hold the clapper 96 in its most clockwise position so that its lug 96A normally is positioned behind lug 90C and therefore the pawl 90 is normally ineffective to drive the ratchet wheel 81 even though the driving arm 87 is reciprocated. If the solenoid 97 is energized at the proper time it will be seen that the clapper 96 will be pulled away from its engagement with the pawl 90 and therefore the pawl will be engageable with the ratchet wheel 81. It should be noted that the pawl 90 is positioned on arm 87 for engagement with the ratchet wheel 81 during each reciprocation of the driving arm 87, but is normally restrained from engaging the ratchet wheel 81 by means of the solenoid clapper 96. That is, if the solenoid 97 is not energized the pawl 90 will rotate about its pivot point on the driving lever 87 and thus rotate in a counterclockwise direction with respect to the arm 87 as the arm is driven rearwardly. However if the solenoid 97 is energized the clapper 96 is pulled away from the pawl 90 and hence the pawl 90 maintains its same relative position on the arm 87 as the arm is driven. Therefore the pawl engages the ratchet wheel 81 to advance it by one tooth. During such a drive operation the solenoid 97 will be de-energized after pawl 90 has moved beyond latching position. Thus the edge of the arcuate lug 96A will move into engagement with the left end of lug 90C. Upon return of the driving arm 87 to the position shown in FIGS. 1 and 5 after the tape feed operation, the lug 90C will be positioned sufficiently forward of the lug 96A on clapper 96 to permit the clapper to complete its clockwise movement into latching engagement with the lug 90C under the urge of spring 98.

A driving arrangement substantially identical to that described above for the ratchet wheel 81 is provided for the lower ratchet wheel 80. Thus as seen in FIGS. 1 and 5 a second driving pawl 100 is pivoted on the upper end of the driving arm 82 and is urged in a counterclockwise direction thereon by the coil spring 102. The rightwardly extending stud 100A on the pawl 100 serves to limit the pawl 100 by engaging the upper and rearwardly extending end of the driving arm 82. The pawl 100 also has a leftwardly extending lug 100B which is engageable with a second abutment member 103 secured on the left side of frame 53 to hold the pawl 100 against the ratchet wheel 80 near the end of a drive operation to prevent overthrow thereof. A second clapper 106 controlled by a solenoid 107 is urged clockwise by a spring 108 so that its arcuate lug 106A is engaged with the lug 100C on the pawl 100 and serves to control said pawl in the same manner as the clapper 96 controls pawl 90. That is, the clapper 106 normally prevents engagement of the pawl 100 with the ratchet wheel 80, but upon energization of solenoid 107 the clapper is pulled from the path of the pawl. A second detent arm 109 pivoted at 110 on the frame 53 has a leftwardly extending roller 111 thereon which engages the teeth of ratchet wheel 80, a spring 112 serving to hold the roller in engagement with the wheel.

The main driveshaft 37 can be driven in any of a number of well known ways. For example, the shaft 37 can be connected to a source of power through a conventional single cycle clutch mechanism as is common in the art. Since each of the cams on the shaft are so shaped that two perforating cycles of operation will occur in response to one complete rotation of the shaft 37 it is only necessary for the shaft to be rotated through 180° for one perforating cycle. Thus when a single cycle clutch is used the shaft is started at the 0° position indicated in FIG. 12 and stopped at the 180° position.

Since the movement of the interposers rearwardly to couple the punch pins with the driveshaft and the movement of the feed pawls into engagement with the ratchet wheels is controlled by solenoids with the various parts being under the direct control of the shaft 37, the perforator can be operated in an asynchronous manner. That is, the shaft 37 can be constantly rotated or it can be intermittently driven without having a predetermined start or stop position. Therefore the perforator can be operated at a high speed without requiring an accurate single cycle clutch, the cost of which generally increases as the speed of operation is increased.

The feeding of the tapes is controlled by independent feed devices and therefore the perforator can be used to selectively punch information in one, the other, or each of the two tapes. Additional tapes and tape feed devices can of course be provided, two being shown for purpose of illustration only. The selective punching of the tapes is accomplished by using an end-of-word code comprising the punching of each of the record receiving areas of the tapes so that if one tape is advanced at a later time while the other is held stationary the subsequent movement of selected punch pins will cause only the advanced tape to be perforated. Since the various parts in the perforator are under the positive control of the common driveshaft, the timing for the input of the necessary electrical control signals may be advantageously derived from the shaft. Furthermore, since the feed pawls are driven by the shaft prior to the driving motion of the punch bail, with each feed pawl being normally disabled, the perforator can be operated so that the selection of the tape to receive information can be made during the cycle of operation in which the perforating occurs.

Although various circuits known in the art can be used to control the application of the input signals to the perforator when it is intermittently driven by a one cycle clutch, there is illustrated in FIG. 11 a preferred embodiment of a control circuit which allows the perforator shaft 37 to be either continuously rotated at a high speed or intermittently driven through a conventional clutch. Therefore a one cycle clutch is not required. The circuit illustrated is the same as that illustrated and claimed in a copending application Serial No. 100,222, filed on the same day as this application issued as Patent No. 3,070,292 to Flavius A. Mathamel, entitled "Record Perforator," and assigned to the present assignee.

The power supply circuit of FIG. 11A is utilized to provide current to the operating circuit of FIG. 11 and includes a source of A.C. potential 130 having a motor 131 connected thereacross. A manually operable switch 132 serves to control the application of the A.C. potential to the motor. A conventional bridge rectifier circuit including diodes 133 and the filter capacitor 134 provides a D.C. potential between the output terminal 136 and ground terminal 137. The shaft of motor 131 is advantageously connected directly with shaft 37 or is coupled therewith through a conventional clutch device.

In the circuit of FIG. 11 the closing of feed switch 140 serves to initiate a tape feed operation in which each of the interposer control solenoids 21 and 27 will be energized as well as one, the other, or both of the tape feed control solenoids 97 and 107. The closing of switch 140 applies the positive potential of terminal 136 which operates to close contacts 161A. Therefore the potential of terminal 136 is applied to a first cam controlled switch means in the form of contacts 143 over the relay contact 144A. When cam 145 secured to shaft 37 closes the contacts 143 relay 146 having two sets of contacts 146A and 146B controlled thereby will be energized. Contacts 146A serve to provide a holding circuit for relay 146 even though cam 145 allows the contacts 143 to open. The second set of contacts 146B of relay 146 are connected in series arrangement with a second set of cam controlled contacts 147 controlled by a cam 148 secured to the main driveshaft 37 (FIG. 1). Accordingly, when the second set of cam controlled contacts 147 are closed positive potential will be applied to the common buss 149. Since contacts 161B controlled by relay 161 were closed by the operation of relay 161, the positive potential from buss 149 will be applied across diodes 150 to the common terminal strips 151 to which the individual interposer control solenoids 21 are connected. Accordingly the interposers will be released for movement in the manner above described. Therefore the punch bail will move the punch pins through the tapes. Also it will be seen that the solenoid 27 which controls the feed punch interposer is directly connected between buss 149 and ground potential so that each time buss 149 is provided with the positive potential of terminal 136 the feed interposer will be released.

First and second tape feed control switches 153 and 154 are respectively connected in series arrangement with the feed control solenoids 97 and 107 between the buss 149 and ground. The switches 153 and 154 can be manually set so that one, the other, or both of the solenoids 97 and 107 will be energized in response to the positive potential being applied to buss 149. It should be noted that the switch arrangement is such that one of the feed control solenoids will always be energized in response to buss 149 being energized. As will be described hereinafter the switches 153 and 154 may be advantageously closed in response to the operation of selected operation control keys on an accounting machine or similar type device used as a source of input information to the punch.

To prevent the repeated punching of the tape feed or end-of-word code in the event that the switch 140 is held closed, a relay 144 is energized to move its contacts 144A into engagement with the line 155. The circuit for energizing relay 144 extends from buss 149 over diode 156, switch 170C and the contacts of switch 141. When the relay 144 is energized and the contacts 144A are switched it will be seen that a holding circuit for relay 144 is established over contacts 161A and hence relay 144 remains energized until relay 161 is de-energized. Relay 161 is held energized as long as buss 149 is energized due to the diode 162 and relay contacts 161D which form a holding circuit. The transfer of contacts 144A opens the original circuit for relay 146, and therefore an additional holding circuit for relay 146 is provided from buss 149 over diode 159 to prevent de-energization of relay 146 in response to the transfer of contacts 144A. Accordingly relay 146 will remain energized as long as the cam controlled contacts 147 remain closed to maintain buss 149 energized. As soon as the cam controlled contacts 147 open the positive potential applied to buss 149 is removed and the circuit returns to its original condition if the switch 140 has been released. If the switch 140 has not been released relay 161 remains energized and thus contacts 161A remain closed. Relay 144 would thus remain energized and prevent the application of a second pulse to relay 146 until switch 140 is opened to permit contacts 144A to return to normal. It is thus seen that a single tape feed or end-of-word code comprising the punching of all the holes across the tape will be punched in response to the operation of switch 140. The timing of the various operations taking place will be described hereinafter in connection with the timing diagram of FIG. 12.

When the tapes are initially positioned in the throat of the punch it is advantageous to provide means for punching and feeding an initial strip of the two tapes therethrough. Accordingly a continuous tape feed key or switch 160 is provided. When switch 160 is closed relay 161 will be energized and therefore its first set of contacts 161A will be transferred so that the positive potential of terminal 136 will be applied to relay 146 over contacts 144A when cam 145 closes contacts 143. Accordingly as set forth above when relay 146 is energized, the buss 149 will be supplied with positive potential when cam 148 closes contacts 147. The contacts 161B will have been transferred in response to the energization of relay 161 so that the positive potential of buss 149 will be applied over diodes 150 to the interposer control solenoids and hence each of the punch pins will be operable.

Prior to the operation of the continuous tape feed switch 160, the operator would position the feed control switches 153 and 154 so that both of the solenoids 97 and 107 would be energized to release each of the tape feed pawls for operation in the manner previously described (the timing of which is described hereinafter). It is of course evident that the switches 153 and 154 could also be closed by the operation of the switch 160. Since the relay 144 would normally transfer the contacts 144A and hence cause de-energization of relay 146 when cam 148 releases contacts 147 (relay 146 at such time being energized from buss 149 through diode 159) it is necessary to prevent the energization of relay 144. Accordingly a switch 141 is ganged with switch 160 so that the contacts of switch 141 are opened at the same time that the contacts of switch 160 are closed. Therefore relay 144 does not become energized. Since contacts 161A are held closed and contacts 144A are not transferred, relay 146 will be de-energized when cam 148 opens contacts 147 but will be again re-energized as soon as cam 145 closes contacts 143. Therefore it is seen that the buss 149 will be repeatedly pulsed with the positive potential of terminal 136 as contacts 147 open and close and therefore the tape feed or end-of-word code consisting of the punching of all holes will occur repeatedly as long as switch 160 is held closed. As will be seen hereinafter, due to the asynchronous manner of operation of the punch it is possible that the operator might release switch 160 at any time during the cycling of the punch. The contacts 161D which are closed to provide a holding circuit for relay 161 from buss 149 over diode 162 make certain that regardless of when the switch 160 is released the perforator will complete the existing cycle of operation, upon the completion of which cam 148 will open contacts 147 to cause the de-energization of relay 161 and place the circuit in its original condition.

The perforator is particularly well suited for use with an accounting or similar-type machine in an application where it is desirable to record separate types of information on individual record strips. Accounting machines adapted for controlling a tape perforator and including coded electrical readout means are well known in the art and therefore the details of such a machine are not included herein. As seen in FIG. 11 an accounting machine having a readout and encoding mechanism is shown in block form at 169. To render the accounting machine operable to control the perforator of the present invention, manual switch 170 is closed. Therefore contacts 170A complete the circuit from buss 149 to the accounting machine, contacts 170B in the circuit from terminal 136 to solenoid 146 are closed, and contacts 170C in the circuit extending from buss 149 to solenoid 144 are opened. The switches 153 and 154 which control the operability of the two tape feed devices are advantageously controlled by separate operation control keys on the accounting machine so that the switches 153 and 154 are set in accordance with the recording program desired. That is, cycles of operation on the accounting machine initiated by a first motor bar may cause punching of information on one tape only, cycles of operation initiated by a second motor bar may cause punching of information on the second tape only, and cycles of operation initiated by a third motor bar may cause the punching of information in both tapes. It is obvious of course that switches 153 and 154 can be controlled from the program control mechanism of the accounting machine, as for example the carriage controls of the accounting machine. A particular advantage of the present invention as used with an accounting machine is that the selection of the tape or tapes to be perforated can be performed by the initiation of the accounting machine cycle and does not require a separate operation by the operator.

When an amount has been set in the accounting machine readout mechanism, the switch 171 is closed by mechanism in the accounting machine and held closed till the end of the perforating operations. Therefore potential will be applied from terminal 136 over switch 171, contacts 170B, contacts 144A, and the cam-controlled contacts 143 to relay 146. Thereafter the operation of the perforator will be substantially the same as described above in connection with the operation of the tape feed key 160. That is, since contacts 170C are opened relay 144 will not be energized and contacts 144A will not be transferred to break the circuit to relay 146. Accordingly each time cam 148 closes contacts 147 a pulse will be applied through the accounting machine readout and encoder mechanism to the interposer control solenoids 21 as well as to the selected feed control solenoids 97 and 107. As is common in the art the readout mechanism used with the accounting machine 169 preferably includes a stepper switch and therefore the pulse applied from terminal 136 may be used to advance the stepper switch. The readout mechanism is programmed so that when the contact of the stepper has completed its movement through each of the orders to be read out it will be advanced to a tape feed contact. This contact is connected to the terminal strips 151 through a plurality of diodes such as 150 to cause the tape feed code to be punched. Following the punching of the end-of-word or tape feed code the stepper in the readout mechanism of the accounting machine returns to its rest position and the switch 171 is opened. It should be noted that since the cycle of the perforator is tape feed and then punch, the position of the two tapes following the cycle of operation in which the end-of-word code is punched is such that each of the two tapes will have a section thereof with the tape feed code punched therein disposed in line with the punch pins. Accordingly, if during a subsequent perforating cycle only one of the feed solenoids 97 or 107 is energized to advance one of the tapes the movement of the punch pins to perforate the advanced tape will have no effect on the non-advanced tape.

The circuit illustrated in FIG. 11 is also adapted for use with a typewriter. As is well known in the art the operation of the keys on a typewriter can be used to close combinations of switches to provide an electrical readout of the typewriter to a recording mechanism such as a tape perforator. Since such readout devices are well known in the art a description thereof is not included herein, but the switches which are closed in combinations to represent a given character are illustrated in FIG. 11 as the readout switches 180. A manual switch 181 is closed to render the typewriter operable for controlling the perforator, and such operation of switch 181 not only connects buss 149 to the typewriter readout switches 180 but also closes contacts 181A in the circuit from terminal 136 to relay 146. Thereafter the operation of a key on the typewriter will cause a combination of switches 180 as well as the contacts of switch 182 to be closed. As is well known in the art, these switches are held closed till the end of the punching operation. Accordingly the potential of terminal 136 will be applied over the contacts of switch 182 and contacts 181A to the relay 146 in the manner previously described. Thereafter the closing of contacts 147 in response to the rotation of the perforator shaft 37 will apply the potential of terminal 136 to the interposer solenoids 21 over the selected switches 180. Since the circuit from buss 149 to relay 144 is not broken relay 144 will be energized and hence contacts 144A will be transferred. Therefore a single unit of information will be punched even through the typewriter key is held depressed. When the switch 182 is opened at the end of the punching by release of the key, relay 144 will be de-energized, and contacts 144A will return to their initial condition.

When used with a typewriter as the source of information, the tab bar of the typewriter can be adapted to control the operation of the tape feed switch 140 and therefore the end-of-word or tape feed code will be punched. Similarly the typewriter space bar can be used to operate switch 140 so that the end-of-word code is punched between adjacent words. This could of course be controlled by any other key on the typewriter. In such an application the switches 153 and 154 would be manually set to determine which of the two tapes would be perforated in response to the operation of the typewriter, or the switches 153 and 154 could be controlled from the carriage of the typewriter. It is also obvious that each of the switches 180 (or a similar set of switches) could be individually manually set so that the closing of contacts 181, 181A and 182 would cause any selected code to be punched in one, the other, or each of the two tapes.

Also seen in FIG. 11 is a "full" switch 184, a switch 185 controlled by the tape supply reel, and a "broken tape" switch 186. Normally these three switches are in the positions indicated in FIG. 11, and therefore the gas glow tube 187 is shunted. However if the takeup reel becomes full switch 184 closes, or if the supply of tape is depleted switch 185 closes, and hence the circuit extending from terminal 136 over switches 184, 185 and 186 to resistor 188 and ground is opened to that tube 187 will be ignited. Similarly if switch 186 is transferred in response to a tape break tube 187 will be ignited to provide an indication to the operator. Also as seen in FIG. 11 if any one of the three switches 184, 185 or 186 is operated the potential of terminal 136 will be applied to relay 144 and therefore contacts 144A will be transferred to prevent any further punching until the operated switch 184, 185 or 186 has been reset.

For purpose of illustration the perforator has been shown with eight information punch pins, including the associated control apparatus for punching an eight channel tape. It is obvious that the perforator can be used to prepare tapes having less than eight channels. Thus it may be advantageous to include separately operable manual switches between the solenoids 21 and terminal strips 151 so that the solenoids 21 not needed for punching a five or a seven channel tape can be de-activated. In the circuit of FIG. 11 the feed code is illustrated as being composed of eight holes (excluding the feed hole). As is common in the art, the perforator may be equipped with an odd-bit parity check device to serve as a check on the information punched. If such a device is utilized when the perforator is used to punch an eight channel tape, then the feed or end-of-word code should be an odd number of holes—as for example seven holes. When the perforator is used to punch a seven or a five channel tape then the punching of seven or five holes, respectively, to represent the end-of-word or tape feed will satisfy the odd-bit requirement. When used to prepare a plurality of separate tapes having different information recorded thereon the important thing is that the information areas of the tapes be perforated with an end-of-word or tape feed code which enables the punch pins to pass through the end-of-word holes when one tape is held stationary and another tape is advanced to receive information during a subsequent operation.

As previously mentioned, the present perforator when used with the circuit diagram of FIG. 11 can be operated in an asynchronous manner. That is, since the timing of the input pulses to the punch interposers and tape feed devices is derived from the main shaft 37 the shaft 37 can be continuously rotated. To more clearly illustrate the time during which various parts operate as shaft 37 rotates, the timing diagram of FIG. 12 will now be referred to. The cams on shaft 37 are so designed that two complete punching operations can be accomplished during one rotation of shaft 37. Thus it is seen in FIG. 12 that a complete punching sequence can occur during each 180° of rotation of the shaft 37 (as indicated by the degree markers across the top of the diagram). Since the perforator as used with the circuit of FIG. 11 is adapted to have the shaft 37 constantly rotating, the "zero" position of the shaft is arbitrary, and therefore for purpose of illustration the "zero" position in FIG. 12 is taken to be the position of the shaft when the interposers 14 are in the position shown in FIG. 2 prior to their forward movement to the position of FIG. 3. When the perforator shaft is driven intermittently through 180° to punch a single unit of information the switches 143 and 147 are both controlled by cam 148 so that they are both closed at 0° and 180° and opened at 43° and 223°.

Referring now to the timing chart of FIG. 12 it will be seen that contacts 143 are closed by cam 145 from 75° to 133° and from 255° to 313° as the main shaft 37 completes one rotation. Similarly the contacts 147 are closed from 0° to 43°, from 165° to 223°, and from 345° to 360° (there being an overlap of the closed condition of contacts 147 existing from 345° of one revolution to 43° of the next revolution). Since the potential of terminal 136 is applied to buss 149 only if the relay 146 in series circuit with contacts 143 is energized it will be seen that the repeated opening and closing of contacts 143 and 147 will have no effect on the apparatus unless one of the sets of contacts between terminal 136 and contacts 143 are closed during the time that the contacts 143 are closed.

Assuming for example that the switch 140 is operated during the interval from 75° to 133° and held closed until 165°, the relay 146 will remain energized at 165° so that contacts 146B are closed. Thus it will be seen that at 165° the closing of contacts 147 will provide the positive potential of terminal 136 to buss 149 and hence relay 146 will be held energized over diode 159. At 180° the interposer control bail starts to drive the interposers 14 and 15 forwardly and the solenoids 21 are effective to pull their associated latches 20 away from the interposers. Since the contacts 147 are closed until 223° the solenoids 21 remain energized until 223°. At this time the interposer bail allows the interposers 14 and 15 to move rearwardly under the urge of the springs 17. Since closing the tape feed switch 140 caused relay 161 to be energized, contacts 161B were closed and each of the interposers (including the tape feed interposer 15) will move rearwardly to a position of engagement with the punch driving bail 30. In the diagram of FIG. 12 the latches 20 are shown as being held in their operated positions after 223° even though contacts 147 open at 223°. This is due to the residual magnetism in the solenoid cores. However it should be noted that even though such latch 20 is not thusly held by residual magnetism it cannot return to latching position since the interposers 14 move rearward at 223° and the solenoids require a short time to become de-energized.

At 216° the feed pawls start their drive motion, and since the selected solenoids 97 and/or 107 for the feed pawls are energized until 223° the selected feed pawls will move beyond their latching engagement with the clapper latches 96 and 106. Therefore the selected feed pawls will be effective to advance the selected tapes prior to approximately 270°. Therefore at 282° as the punch pins start their upward travel the tapes will have completed their feeding motion and hence be in position to receive the feed code. As the punch pins are driven upwardly the lug 15A on the feed interposer 15 operates the knock-off bail 50 by approximately 295° and hence the latches controlled by solenoids 21 are driven away from the solenoids. Since the interposers at this time are in their rearward positions the latches cannot move to latching positions but merely move into engagement with the interposers at points which are forward of their latching surfaces which engage lugs 20A. The interposer control bail starts to restore the interposers to their forward positions slightly before the punch pins reach their points of maximum displacement and such forward movement of the interposers brings them back to their initial positions at 360°. At that time the interposer latches are spring urged to their home positions of latching engagement with the interposers.

From the above it will be seen that the tape feed code will be punched in response to the closing of contacts 140 and 141. As seen in FIG. 11 the relay 144 was energized in response to buss 149 being energized and therefore contacts 144A were transferred at 165°. Therefore from 165° on the only holding circuit for relay 146 is through contacts 147. Accordingly at 223° when contacts 147 are opened relay 146 is de-energized. Relay 144 remains energized if switch 140 is held closed since contacts 144A were transferred to line 155 and therefore even though contacts 143 are again closed at 255° relay 146 will not be re-energized. Since buss 149 can only be energized when contacts 146B controlled by relay 146 are closed, no further punching can occur until contacts 140 are opened. Accordingly a single tape feed code is punched.

From the above it will be seen that if the relay 144 is not energized (as for example when the continuous tape feed switch 160 is closed) the contacts 144A are not transferred. Accordingly the relay 146 remains energized over its self-holding contacts 146A, the contacts 144A, and contacts 161A. Therefore contacts 146B remain closed and buss 149 is repeatedly pulsed with the positive potential of terminal 136 as the contacts 147 open and close. Since contacts 147 are closed from 345° to 43° (and from 165° to 223°) it will be seen that if an interposer latch 20 operated for the operation occurring between 180° and 360° is to be again released for the next punching operation occurring between 360° and 180°, then said latch would be operated at 345° when contacts 147 re-close rather than first moving to latching position as indicated by the solid curve for latches 20 in FIG. 12. This is indicated by the dotted lines in FIG. 12. Thus the perforator will repeatedly punch the selected information into the tape or tapes. It should be noted that the timing of the drive of the feed pawls with respect to the movement of the punch pins in connection with the closing of contacts 147 is such that the feed operation is completed prior to the time that the punch pins are driven through the tapes. Therefore the closing of the tape selection switches 153 and 154 can be made during the cycle of operation in which a unit of information is being punched.

In FIG. 10 there is illustrated two pieces of seven channel tape perforated in accordance with the present invention by using an accounting machine readout mechanism to supply the input signals to the perforator, the solenoid for the eighth channel having been disconnected. In using the perforator to produce tapes having less than eight channels, the control solenoids 21 associated with the non-used channels are rendered non-operative by disconnecting them from the terminal strips 151. To facilitate this disconnection there can advantageously be provided manual switches in the circuit. In FIG. 10 both tapes were first punched by the operation of the "continuous" tape feed switch 160. Tape A was then punched with the number "56951" by the operation of a first motor bar on the accounting machine which closed switch 153 and opened switch 154. At the end of the punching of "56951" in tape A the stepper switch in the readout device of the accounting machine was advanced to the "end-or-word" contact so that the end-of-word code comprised of the punching of all seven channels was punched. Then the number "62" was punched in tape B by the operation of a second motor bar on the accounting machine which was effective to close switch 154 and to transfer switch 153. Therefore only tape B received the "62," the punch pins during such operation passing through the end-of-word holes previously punched in tape A. Following the punching of "62" the stepper switch again advanced to the "end-of-word" contact so that the last thing punched in tape B was the end-of-word code. The operation of a third motor bar on the accounting machine then closed switches 153 and 154 so that both tape feed control solenoids were energized and hence "739" was punched in both tapes. The last step of the stepper-switch readout from the accounting machine then caused the end-of-word code to be applied to the perforator so that each tape was punched with the end-of-word code. Therefore each of the tapes is positioned with the end-of-word holes in alignment with the punch pins at the end of the punching operation. Thus if only one tape is advanced to receive the next unit of information the punch pins will pass through the end-of-word holes of the non-advanced tape.

Since the various elements in the perforator as well as the timing contacts 143 and 147 are under the positive control of the main shaft 37 and the cams thereon, the perforator can be operated at a relatively high speed. Therefore the length of time which the switch or switches such as 140 or 182 must be held closed is very short. For example when the shaft 37 is rotating at a constant speed of 1800 r.p.m. (corresponding to a punching speed of 60 per second) each degree on the timing diagram of FIG. 12 is equal to slightly less than 0.1 millisecond. The longest time that the switch 140 would have to be held would occur in the case where the switch is closed immediately after 133°. In such a case the switch would have to be held until 345° or a maximum of 212°. This corresponds to slightly less than 20 milliseconds. This time would of course be decreased as the speed of the shaft 37 is increased. When the perforator is used with an accounting machine readout having a stepper switch arrangement for controlling the application of code combinations to the terminal strips 151, the stepper solenoid can advantageously be controlled directly by the potential on buss 149. Therefore the stepper and the perforator will be certain to be in synchronism as the various orders of the accounting machine are read out.

There has been disclosed an improved method of selectively recording information on one or a plurality of individual record tapes using a single recording device. There has also been disclosed an improved tape perforator for individually and selectively punching a plurality of tapes and which may advantageously be operated in an asynchronous manner to eliminate the need for a one cycle clutch. The disclosed apparatus merely represents a preferred embodiment of the invention, and therefore various modifications thereof which are evident to one skilled in the art are intended to be included within the scope of the following claims.

What is claimed is:

1. A record producing device comprising in combination: support means for holding first and second tapes in juxtaposition; a plurality of signal responsive marking means each adapted to simultaneously mark each of said tapes; first and second tape advancing means respectively coupled with said tapes, and independent control means for each of said advancing means responsive to control signals for controlling the operation of said tape advancing means.

2. An information recording device comprising in combination: a plurality of punches movable from first to second positions; means defining an opening for positioning a plurality of tapes in the path of movement of said punches; and a plurality of tape advancing devices each engaged with one of said tapes and individually selectively operable for advancing the engaged tape.

3. In a perforator having a plurality of punch pins movable from first to second positions for perforating record material disposed in the path thereof, the combination comprising: first and second feed sprocket wheels; first and second independent drive means associated with and selectively engageable with one of said wheels; and power means adapted to drive said last named means during a first time interval and to drive said punch pins to their said second positions during a second time interval subsequent to said first time interval.

4. A tape perforator comprising in combination: a punch block assembly having an opening therein adapted to receive first and second tapes; a plurality of punches each movable from first to second positions through said opening for perforating each tape disposed therein; first and second tape advancing mechanisms each associated with one of said tapes; first and second signal responsive means for individually controlling the operation of one of said advancing mechanisms; and drive means for actuating one of said tape advancing mechanisms during a first portion of a cycle of operation and for them driving selected punches from their first to their second positions during a second portion of a cycle of operation.

5. A tape perforator comprising in combination: a plurality of punches; cam means operable to drive said punches from first to second positions; support means for holding first and second tapes in the path of movement of said punches from their first to their second positions; first and second tape advancing devices respectively engaged with said first and second tapes; first and second drive means engageable with said first and second tape advancing devices; and control means operable to selectively control the engagement of each of said drive means with said advancing devices.

6. A tape perforator comprising in combination a plurality of punch pins; power means; signal responsive means for coupling selected combinations of said pins to said power means for movement thereby from first to second positions; a punch block assembly for holding first and second tapes in juxtaposition in the path of travel of each of said punch pins from their first to their second positions; and tape advancing means for selectively advancing one, the other, or both of said tapes to position new sections thereof in the path of travel of said punch pins.

7. A perforating device comprising in combination a punch block assembly having a plurality of first openings therein and a second opening for holding record material transverse to said first openings; a plurality of punches movable in said first openings; power means operable to drive said punches from first to second positions for perforating said material; first and second feed sprocket wheels supported for independent rotation; first and second drive means respectively associated with said first and second sprocket wheels; and control means for individually controlling each of said drive means.

8. A tape perforator comprising in combination: a plurality of punch pins each movable from a first to a second position; support means adapted to hold a plurality of tapes to be perforated intermediate the first and second positions of said punch pins; first and second individually operable tape feed devices each associated with a different tape and operable upon being driven to advance the associated tape; power means; first signal responsive means for coupling a punch pin with said power means in response to a first signal; second signal responsive means for coupling said first tape feed device with said power means; and third signal responsive means for coupling said second tape feed device with said power means.

9. A tape perforator as defined in claim 8 wherein said power means operates at least one of said tape feed devices before driving a punch pin from its first to its second position.

10. A tape perforator comprising in combination: punch block means adapted to hold first and second strips of tape in juxtaposition; a punch pin movable from a first to a second position to perforate each of said tapes; first and second tape feed devices, each associated with one of said tapes; power means for driving the perforator through cycles of operation; an interposer movable from a first position to a second position to couple said punch pin with said power means; first control means coupled with said power means adapted to control the movement of said interposer from its first to its second position in response to a first signal; second control means associated with said first feed device for controlling the coupling of said first feed device with said power means; and third control means associated with said second feed device for controlling the coupling of said second feed device with said power means.

11. A record perforating apparatus comprising in combination: a plurality of punch pins each movable from first to second positions; punch block means adapted to hold first and second pieces of record material in the path of movement of said pins; a main driveshaft; punch pin driving means operatively coupled with said shaft; a plurality of interposer elements each associated with one of said punch pins and moveable from a first to a second position, said elements being operable when in their second positions to couple the associated pin with said pin driving means; latching means holding said elements in their said first positions; a plurality of solenoids associated with said latching means operable in response to control signals applied thereto to release selected interposers for movement to their said second positions; an interposer control bail operated by said shaft and adapted to control the movement of said interposers from their first to their second positions and to restore each interposer to its first position; first and second feed sprocket wheels respectively engageable with said pieces of record material; first and second ratchet wheels respectively connected to said sprocket wheels; first and second feed pawls movable from first to second positions and engageable with said ratchet wheels to advance said materials; means driven by said shaft for reciprocating said pawls between their said first and second positions; first and second pawl latches respectively engageable with said pawls to normally prevent engagement of said pawls with the associated ratchet wheels as the pawls are driven from their said first to their said second positions; and first and second solenoids associated with said pawl latches and operable in response to control signals to move said latches from engagement with said feed pawls whereby said pawls will be effective to advance the associated material.

12. The method of recording a bit of information on one, the other, or both of two tapes using the single movement of selected ones of a set of N punch pins from first to second positions comprising the steps of: positioning the two tapes in juxtaposition in the path of movement of said pins from their first to their second positions; driving each of said N pins from their first to their second positions; advancing one, the other, or both of said tapes to position a new section thereof in the path of travel of the punch pins; and driving a selected combination of pins representing the bit of information from their first to their second positions, whereby the movement of the selected combination of pins will perforate only the advanced tape or tapes while passing through the holes previously perforated in a non-advanced tape by the movement of each of the N pins from their first to their second positions.

13. The method of recording a first bit of information on first and second tapes and a second bit of information only on the first tape using a single set of N punch pins, comprising the steps of driving a selected group of the pins representing the first bit of information through each of the tapes, advancing each of the tapes, driving each of the N pins through each of the tapes, advancing the first tape while holding the second tape stationary, driving a selected group of the pins representing the second bit of information through the first tape and through the holes previously punched in the second tape by the movement of each of the N pins therethrough, advancing the first tape while holding the second tape stationary, and driving each of the N pins through the first tape and through the holes punched in the second tape by the previous movement of each of the N pins therethrough.

14. A record producing device comprising in combination: support means for holding first and second record media in juxtaposition, a plurality of signal-responsive marking means each adapted to simultaneously mark each of said record media, independently operable advancing means respectively coupled with said media, and independent control means for each of said advancing means responsive to control signals for controlling the operation of said media advancing means, wherein one of the medium advancing means is operated during each marking cycle of operation prior to the operation of any marking means.

References Cited in the file of this patent

UNITED STATES PATENTS

| | | |
|---|---|---|
| 964,951 | Ball | July 19, 1910 |
| 1,159,694 | Marchthal | Nov. 9, 1915 |
| 1,914,293 | Reynolds | June 13, 1933 |
| 2,008,396 | Lasker | July 16, 1935 |
| 2,451,045 | Potts | Oct. 12, 1948 |
| 3,024,971 | Kettnich | Mar. 13, 1962 |